United States Patent [19]

Sojka

[11] 4,161,198

[45] Jul. 17, 1979

[54] APPARATUS FOR HANDLING WASTES FROM SMALL ANIMAL CAGES

[75] Inventor: Nickolas J. Sojka, Charlottesville, Va.

[73] Assignee: University of Virginia Alumni Patents Foundation, Charlottesville, Va.

[21] Appl. No.: 743,090

[22] Filed: Nov. 18, 1976

Related U.S. Application Data

[62] Division of Ser. No. 587,306, Jun. 16, 1975, Pat. No. 4,009,685.

[51] Int. Cl.² .......................... B67C 7/00; B65B 3/04
[52] U.S. Cl. ...................................... 141/92; 141/231
[58] Field of Search .............. 134/102, 104, 144, 152, 134/165, 167 R, 172–174, 180–181, 198, 200, 89, 85, 90, 91, 92, 98, 231, 232, 233, 48, 63

[56] References Cited

U.S. PATENT DOCUMENTS

| 2,404,286 | 7/1946 | Graham | 134/167 R |
| 3,037,887 | 6/1962 | Brenner et al. | 134/102 X |
| 3,900,040 | 8/1975 | Graber et al. | 134/152 X |

FOREIGN PATENT DOCUMENTS

| 1461609 | 11/1966 | France | 134/198 |
| 1499536 | 9/1967 | France | 134/102 |

*Primary Examiner*—Houston S. Bell
*Attorney, Agent, or Firm*—Ferris M. Stout

[57] ABSTRACT

A portable machine for servicing small animal cage litter trays which is independent of water and waste connections.

1 Claim, 6 Drawing Figures

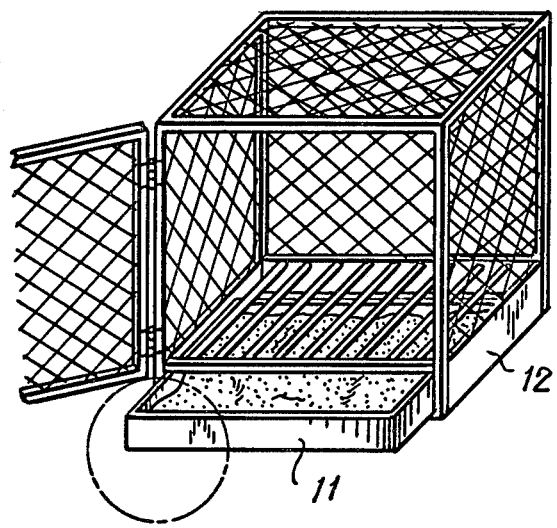
FIG. 1
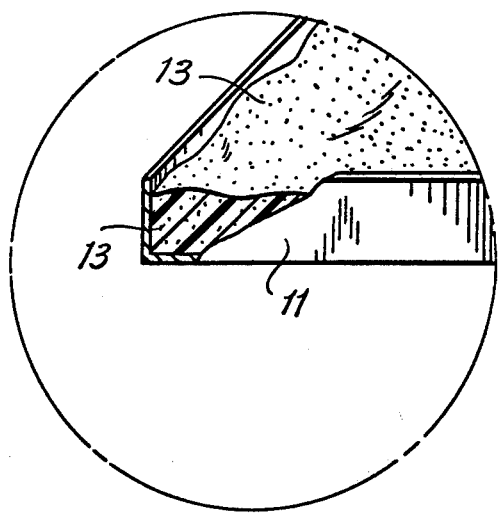
FIG. 1A
FIG. 3
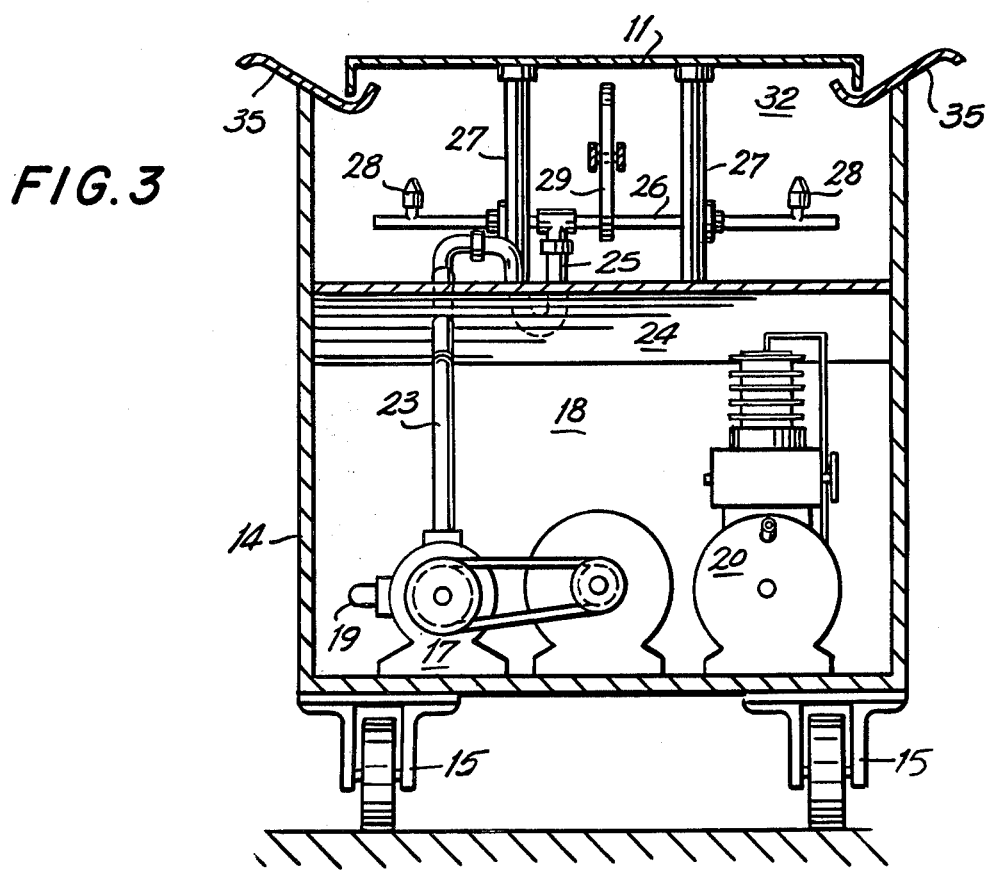

APPARATUS FOR HANDLING WASTES FROM SMALL ANIMAL CAGES

This is a division of application Ser. No. 587,306 filed June 16, 1975, now U.S. Pat. No. 4,009,685.

BACKGROUND OF THE INVENTION

1. Field of the Invention

The present invention relates to a machine for cleaning small animal cage litter trays.

2. Description of the Prior Art

When small animals are kept in cages in which the animals are not in contact with bedding, but rather are housed upon a wire mesh or otherwise perforate floor, animal wastes drop through the floor and into a litter tray beneath the cage which can be removed for cleaning. For hygenic and aesthetic reasons a substance is provided in the tray which will absorb or suspend liquid wastes and deodorize both liquids and solids, and which can be disposed of when soiled. Many bulk litter materials have been tried and have been used for this purpose, among them being shredded alfalfa, shredded aspen, shredded peat moss, wood shavings, and the like. Although these materials are absorbent, they are bulky, messy to handle, and often constitute a fire hazard in storage. Moreover, depending on the economic situation of the moment, they are often either expensive or unobtainable. Disposal of the soiled litter, which often constitutes a considerable bulk, can be expensive, particularly in a vivarium. Soiled wastes are often imperfectly suspended in the solid litter. When the tray is emptied, some of the waste remains smeared on the tray. The next batch of litter will then be inoculated with odor-causing bacteria. To prevent this happening, each set of trays is commonly washed in a separate, remote facility, while clean trays from a second set are installed in the cages.

SUMMARY OF THE INVENTION

The present invention relates to a new and improved means for handling the wastes from small animal cages, when the wastes are collected in foam-filled trays in accordance with U.S. Pat. No. 4,009,685.

An object of the invention is to provide means for cleaning foam filled animal litter trays and recharging the cleaned trays with foam at the site of the animal cage.

Another object of the invention is to provide for cleaning and recharging foam-filled animal litter trays with a cleaning machine which requires only an electrical power connection for the cleaning operation.

Another object of the invention is to provide new and improved apparatus for treating wastes produced by caged animals.

In place of solid fibrous litter, a long-lasting, aqueous foam is provided in the litter tray. The foam has the property of closing over the hole which an object or splash of liquid dropped into it makes: that is to say, the hole "heals", so that a continuous, relatively air-tight surface of foam covers the tray surface. Pieces of solid waste and splashes of liquid waste are thereby largely sealed from the atmosphere: objectionable odors cannot escape, and the shortage of oxygen at the surface of the waste strongly inhibits the growth of microorganisms and the processes of decomposition which cause odors.

When the foam has become soiled with animal wastes, it is readily disposed of by flushing the soiled foam from the litter tray into a suitable receptacle or into the sewer with a jet of water. A typical foam has an expansion of as much as twenty to one: that is to say, the foam is composed of nineteen volumes of air and one volume of foam composition. A small-volume jet of relatively high pressure water suffices to flush the foam from the litter tray and to collapse the foam. When, many cages are cleaned, the volume of the refuse-bearing foam is therefore relatively manageable: its volume is many times less than the volume of the solid, fibrous type litter. Moreover, the refuse can be readily disposed of in any convenient sewer, whereas solid, fibrous type litters must be carted away from the premise to a suitable disposal site, often at considerable expense.

Since the liquid composition from which the foam is generated comprises only about one-twentieth of the volume of the foam, it is practical to combine a reservoir of the foam generating liquid, a foam generating means and a tray-washing machine into a single tray washing machine unit. Such a machine eliminates the requirement of multiple trips in and out of animal cage rooms, thereby saving much labor and attendant spillage in cage rooms, hallways, and storage rooms.

The present invention, as well as further objects and features thereof, will be more fully understood from the following description of a preferred embodiment, when read with reference to the accompanying drawings.

DESCRIPTION OF THE DRAWINGS

FIG. 1 is a perspective drawing of a typical small animal cage. The litter tray is shown partly withdrawn.

FIG. 1A is a fragmentary perspective view of a portion of the apparatus shown in FIG. 1.

FIG. 3 is a section taken along the line 3—3 of FIG. 2.

DESCRIPTION OF A PREFERRED EMBODIMENT

Figure 2:
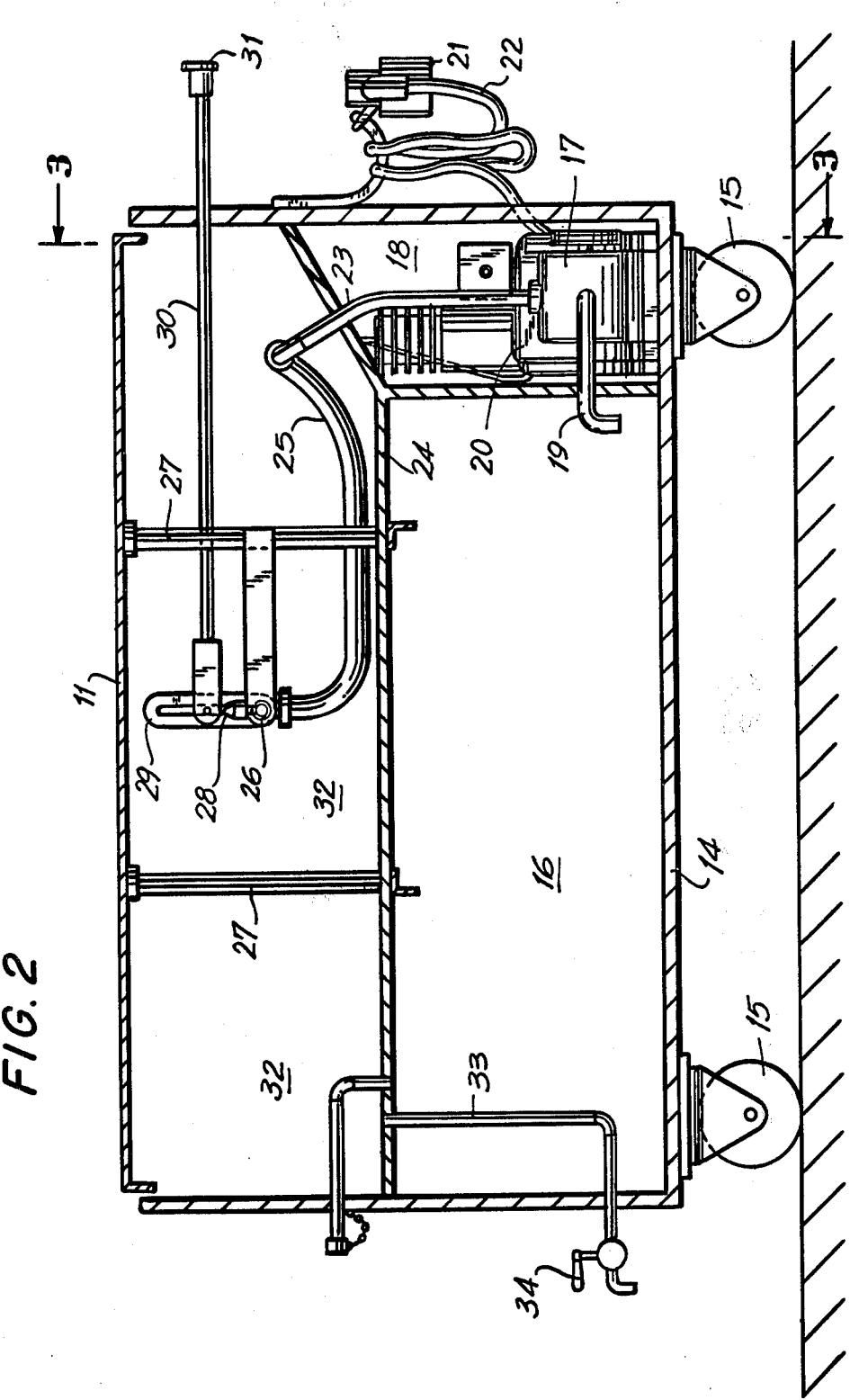
FIG. 2 is a side elevational view of a litter tray washing machine useful with animal cages in accordance with an embodiment of the invention.

In the accompanying drawings,

FIG. 1 is a perspective view of a typical small animal cage. 10 is the slatted floor of the cage. 11 is a rectangular litter tray, containing aqueous foam, shown partly withdrawn from the aperature in which it slides, formed by extensions 12 of the sides of the cage. FIG. 1-A is a magnified view of a corner of the tray 11 shown with a portion of the front edge cut away to show the foam 13 in the tray.

In FIG. 2 the side of a tray washing machine facing the observer is shown removed to illustrate the interior. The tray washing machine comprises a cabinet with spray apparatus mounted upon a wheeled frame. Stainless steel is used for construction. In other embodiments aluminum may be used. Steel may be used if adequately protected from corrosion. The frame 14 of the tray washing machine is supported by castors 15. Compartment 16 is a reservoir for rinsing water from which pump 17, in compartment 18, draws its intake through pipe 19. Pump 17 is driven by a motor (not shown) which is controlled by a switch and timer circuit (not shown) so that when the switch is activated, the pump will run for a preselected time and turn off. Compartment 18 also contains an air compressor and tank 20, to which a foam gun 21 is attached by hose 22. The foam gun comprises a receptacle for foam composition, a foam nozzle, and a valve for actuating it. (In another embodiment, the air compressor may be replaced by a foam generator, such as the device sold by Waukesha Foundry Company, Inc., 1300 Lincoln Avenue, Waukesha, Wis., 53186.)

Pump 17 delivers rinsing water from compartment 16, which has been previously filled, through pipe 23 which penetrates, and is externally sealed to, divider 24, and through flexible hose 25, to manifold 26. Manifold 26 is rotatably mounted to the sides of tray supports 27, shown supporting tray 11 in an inverted position. Spray nozzles 28 are installed on manifold 26, facing upwards. Arm 29, which is fixed to manifold 26, has a longitudinal slot to which shaft 30 is pivotably connected. When handle 31, attached to the other end of shaft 30, is moved laterally, manifold 26 rotates through an arc, so that spray from nozzles 28 covers the interior surface of inverted tray 11.

Compartment 32 receives wastes, rinse water, and collapsed foam flushed from inverted tray 11. Pipe 33 and valve 34 provide means for draining compartment 32.

In FIG. 3 the location of the spray nozzles 28 can be readily seen. Upper edges of the sides of the tray washing machine are equipped with brackets 35 to receive a side of tray 11.

In another embodiment, trays are rinsed into the same compartment which provides intake to pump 17, thereby eliminating the need for a separate compartment, but necessitating provision of a screen (not shown) for pump inlet pipe 19.

To use the tray washing machine, the operator fills compartment 16 with rinse water (which may contain a small amount of silicone foam collapsing compound), wheels it to the site of the animal cages to be cleaned, and plugs its power cord into an electrical outlet. He withdraws a litter tray, with its load of soiled foam, from an animal cage, and rests its long side on the brackets 35. Using the brackets for support he inverts the tray, whereupon the soiled foam in the tray slides into compartment 32. Resting it on tray supports 27, the operator activates the switch controlling the pump motor, pulls out handle 31 and pushes it back in. After the pump motor stops, he turns the tray right side up on the tray supports 27, and with the foam gun 21, refills the tray with clean foam. He replaces the tray in its cage and proceeds to the next one. When a number of trays has been cleaned, he pushes the tray washing machine to a sewer drain and, by opening valve 34, empties compartment 32 into the sewer.

The tray washing machine is independent of water and sewer connections during its use for the tray cleaning operation. Since the cleaning operation requires only a relatively small volume of water to rinse off the foam in the tray, the tray washing machine requires only moderate sized compartments to service several rooms of animal cages. Several rooms of animal cages can be processed before the compartments require refilling, thereby saving much labor. The terms and expressions which have been employed are used as terms of description and not of limitation, and there is no intention in the use of such terms and expressions of excluding any equivalents of the features described or portions thereof, it being recognized that various modifications are possible within the scope of the invention.

What is claimed is:

1. In a machine for washing rectangular trays of the type in which spray nozzles direct a spray of water upwardly against an inverted tray, the spray water and refuse being collected in a first compartment in the machine, the improvementt which comprises
    a second compartment in the machine for a supply of spray water,
    pump means connected between the second compartment and the spray nozzles,
    a third compartment in the machine for a supply of liquid foam composition, and
    foam generating means connected to the third compartment for filling the cleaned rectangular trays with foam.

* * * * *